Oct. 13, 1931.  H. A. GILLIES  1,827,081
BRAKE SHOE
Filed March 2, 1931
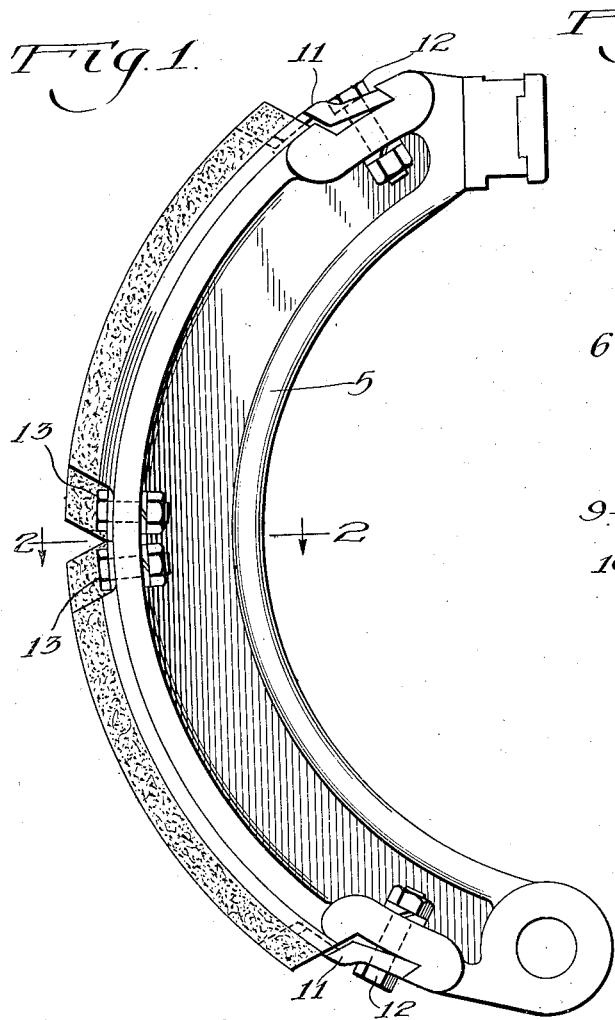
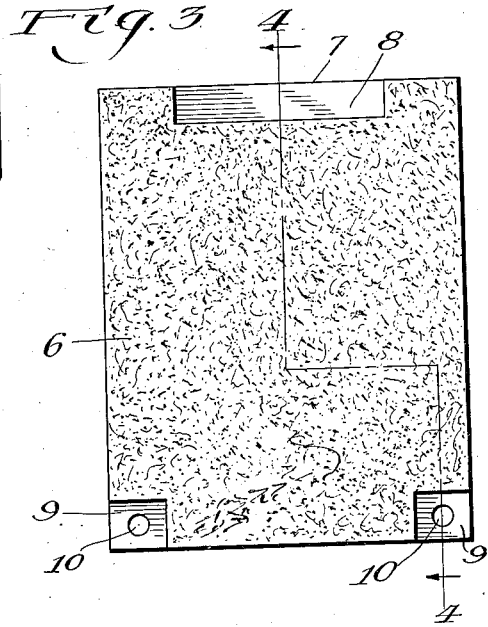
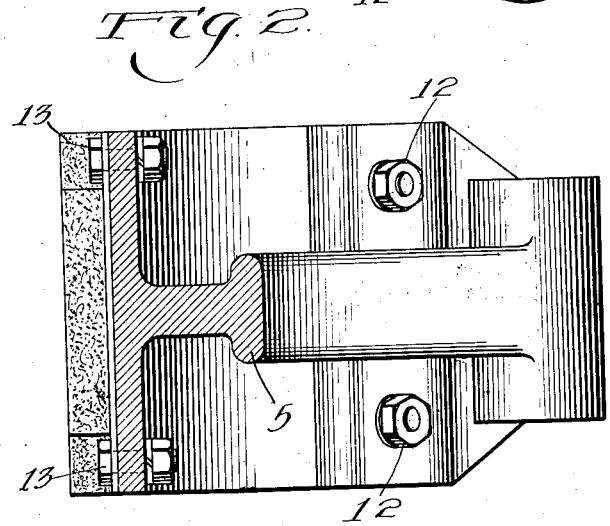
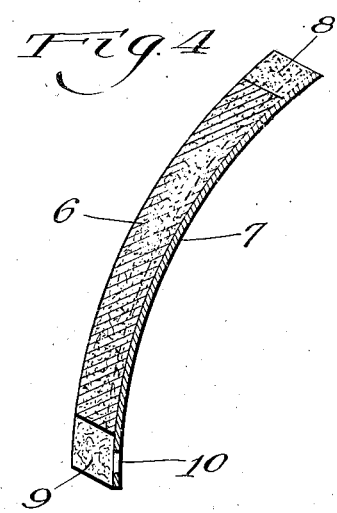
Inventor:
By Hugh A. Gillies
Wm. O. Bell Atty.

Patented Oct. 13, 1931

1,827,081

UNITED STATES PATENT OFFICE

HUGH A. GILLIES, OF DETROIT, MICHIGAN, ASSIGNOR TO AMERICAN BRAKE MATERIALS CORPORATION, OF NEW YORK, N. Y., A CORPORATION OF NEW YORK

BRAKE SHOE

Application filed March 2, 1931. Serial No. 519,289.

This invention relates to friction brakes and has reference more particularly to the manner and means whereby a friction block is fastened in place on its support for service.

One of the objects of the invention is to provide for fastening a block securely in place on its support and in a manner which will permit it to adapt itself to strains and stresses to which it may be subjected in service and without causing distortion of and damage to the block.

In the accompanying drawings I have illustrated a selected embodiment of the invention and referring thereto Fig. 1 is a side elevation showing two brake blocks mounted on a support in the form of a shoe or head for an internal friction brake.

Fig. 2 is a sectional view on the line 2—2 of Fig. 1.

Fig. 3 is a front view of the block.

Fig. 4 is a sectional view on the line 4—4 of Fig. 3.

Referring to the drawings 5 is the shoe or head support for the blocks, each block comprising a body 6 and a back 7 mounted thereon. The body is made of any suitable composition material and the back is made of metal or other suitable material. The body is fastened on or united with the back in any desired manner. In the particular embodiment of the invention illustrated the body is provided with a recess 8 at one end between its sides, and with recessed corners 9 at its other end. The back is exposed at the recesses 8 and 9 and is provided with the bolt openings 10 at the recesses 9. The block is fastened to the shoe by means of a keeper 11 which engages the back 7 in the recess 8 and is fastened by a bolt 12 to the shoe, and by bolts 13 which pass through the openings 10 of the back at the recesses 9 and engage the shoe.

The bolts rigidly fasten the block at the corners of one end to the shoe and prevent movement of the block at that end on the shoe. The keeper securely fastens the other end of the block to the shoe to prevent dislodgement of the block from the shoe, but the keeper does not pass through or interlock with any part of the block and may permit a slight movement of the end of the block relative to the shoe. This allows for expansion and contraction of the block without affecting the fastening means and without causing the block to twist or arch or otherwise become distorted under conditions of service. If the block were fastened at each corner to the shoe by a bolt it would be held rigidly and stresses and strains would be set up in the block in service which would be apt to result in damage to the block; and if the block were fastened by a keeper at each end one or both of the keepers may not be fastened tightly and permit the block to shift on the shoe in service. My combination clamp and bolt fastening means provides a sufficiently rigid fastening and at the same time permits whatever movement of the shoe may be necessary in expansion or contraction in service without causing the block to twist or arch or otherwise distort and impair the set of the block on the shoe.

I have shown and described the invention in a simple form of friction block for internal brakes for automotive vehicles but I reserve the right to embody the invention in any other friction blocks to which it is or may be adapted within the scope of the following claims.

I claim:

1. A friction block comprising a back and a composition body mounted thereon, said body being recessed at one end between its side edges and at the corners of its other end to receive means for fastening the block to a support.

2. A friction block comprising a rigid back and a composition body mounted thereon, said body having a recess in one end and between its sides and also being recessed at the corners of its other end, the back being exposed in all of said recesses and provided with bolt openings at the corner recesses.

HUGH A. GILLIES.